(12) United States Patent
Krappé et al.

(10) Patent No.: US 10,521,491 B2
(45) Date of Patent: Dec. 31, 2019

(54) REAL-TIME AND COMPUTATIONALLY EFFICIENT PREDICTION OF VALUES FOR A QUOTE VARIABLE IN A PRICING APPLICATION

(71) Applicant: Apttus Corporation, San Mateo, CA (US)

(72) Inventors: Kirk G. Krappé, Menlo Park, CA (US); Neehar Giri, Saratoga, CA (US); Man Chan, San Jose, CA (US); Isabelle Chai, San Mateo, CA (US); Rahul Choudhry, Sunnyvale, CA (US); Kitae Kim, London (GB); Stanley Poon, Los Altos, CA (US); Brian Li, Fremont, CA (US); Geeta Deodhar, Foster City, CA (US); Elliott Yama, Danville, CA (US)

(73) Assignee: Apttus Corporation, San Mateo, CA (US)

( * ) Notice: Subject to any disclaimer, the term of this patent is extended or adjusted under 35 U.S.C. 154(b) by 298 days.

(21) Appl. No.: 15/615,091

(22) Filed: Jun. 6, 2017

(65) Prior Publication Data
US 2018/0349324 A1 Dec. 6, 2018

(51) Int. Cl.
*G06F 17/18* (2006.01)
*G06F 17/17* (2006.01)
(Continued)

(52) U.S. Cl.
CPC ............ *G06F 17/18* (2013.01); *G06F 16/435* (2019.01); *G06F 17/175* (2013.01); *G06Q 30/0283* (2013.01)

(58) Field of Classification Search
CPC ......... G06Q 30/00; G06Q 30/06; G06F 17/18
(Continued)

(56) References Cited

U.S. PATENT DOCUMENTS 5,960,407 A 9/1999 Vivona
6,473,084 B1 * 10/2002 Phillips ................. G06Q 40/04
345/440
(Continued)

FOREIGN PATENT DOCUMENTS

| EP | 3073421 | 9/2016 |
| WO | 0052605 | 9/2000 |
| WO | 03003146 | 1/2003 |

OTHER PUBLICATIONS

Oracle: Automating the Quote-to-Cash Process: An Oracle White Paper, Jun. 2009, pp. 1-19, 2009.
(Continued)

*Primary Examiner* — Oluseye Iwarere
(74) *Attorney, Agent, or Firm* — Lessani Law Group, PC (57) ABSTRACT

The present disclosure describes a system, method, and computer program for real-time and computationally efficient calculation of a recommended value range for a quote variable, such as price, discount, volume, or closing time. The system uses the highest-density interval (HDI) of probability density function (PDF) as a recommended or suggested value range for a quote variable. PDFs for the quote variable are precomputed for groups of related inputs, and each PDF is summarized as an array of discrete points. A dimension reduction technique is applied to the PDF inputs in both the training and real-time (non-training) phases to reduce the number of possible combinations of PDFs. During a quote-creation process, a PDF look-up table enables the system to efficiently identify an applicable PDF from the group of precomputed PDFs based on reduced input values.

24 Claims, 7 Drawing Sheets

(51) Int. Cl.
*G06Q 30/02* (2012.01)
*G06F 16/435* (2019.01)

(58) Field of Classification Search
USPC .............................................. 705/21, 20, 37
See application file for complete search history.

(56) References Cited

U.S. PATENT DOCUMENTS

| | | | |
|---|---|---|---|
| 8,498,954 B2* | 7/2013 | Malov | G06Q 30/0201 |
| | | | 706/45 |
| 8,644,842 B2 | 2/2014 | Arrasvuori et al. | |
| 2003/0033240 A1* | 2/2003 | Balson | G06Q 10/10 |
| | | | 705/37 |
| 2006/0100912 A1* | 5/2006 | Kumar | G06Q 40/08 |
| | | | 705/4 |
| 2007/0087756 A1* | 4/2007 | Hoffberg | G06Q 10/0631 |
| | | | 455/450 |
| 2007/0162373 A1* | 7/2007 | Kongtcheu | G06Q 40/00 |
| | | | 705/36 R |
| 2008/0046355 A1 | 2/2008 | Lo | |
| 2009/0222319 A1 | 9/2009 | Cao et al. | |
| 2009/0234710 A1* | 9/2009 | Belgaied Hassine | G06Q 30/02 |
| | | | 705/7.29 |
| 2010/0262478 A1 | 10/2010 | Bamborough et al. | |
| 2010/0306120 A1 | 12/2010 | Ciptawilangga | |
| 2012/0173384 A1 | 7/2012 | Herrmann et al. | |
| 2012/0221410 A1 | 8/2012 | Bennett et al. | |
| 2012/0254092 A1* | 10/2012 | Malov | G06O 30/0201 |
| | | | 706/52 |
| 2013/0103391 A1 | 4/2013 | Millmore et al. | |
| 2013/0132273 A1* | 5/2013 | Stiege | G06Q 20/14 |
| | | | 705/41 |
| 2014/0149273 A1* | 5/2014 | Angell | G06Q 40/04 |
| | | | 705/37 |
| 2015/0120526 A1* | 4/2015 | Peterffy | G06Q 40/04 |
| | | | 705/37 |
| 2015/0142704 A1 | 5/2015 | London | |
| 2016/0034923 A1 | 2/2016 | Majumdar et al. | |
| 2017/0068670 A1 | 3/2017 | Orr et al. | |
| 2017/0124176 A1 | 5/2017 | Beznos et al. | |
| 2017/0124655 A1 | 5/2017 | Crabtree et al. | |
| 2017/0351241 A1 | 12/2017 | Bowers et al. | |

OTHER PUBLICATIONS

Microsoft/APTTUS: Ultimate Guide to Quote-To-Cash for Microsoft Customers, Web Archives, Oct. 1, 2015, pp. 1-28.
Wainwright, Phil, "Salesforce, Microsoft quote-to-cash partner Apttus raises $88m", Sep. 29, 2016, pp. 1-7.
PCT International Search Report and Written Opinion in PCT/US2017/062213, 13 pages, dated Mar. 2, 2018.
Riggins, J., "Interview Quote-to-Cash Pioneers Apttus Links Leads to Revenue", May 21, 2014, pp. 1-7.
Wainewright, Phil, Apttus Applies Azure Machine Learning to Quote-to-Cash, Apr. 3, 2016, pp. 1-5.

* cited by examiner

Future State - Suggested Price Range Recommendation

Fig. 5

REAL-TIME AND COMPUTATIONALLY EFFICIENT PREDICTION OF VALUES FOR A QUOTE VARIABLE IN A PRICING APPLICATION

BACKGROUND OF THE INVENTION

1. Field of the Invention

This invention relates generally to configure, price, and quote applications and, more specifically, to a method for real-time, computationally efficient generation of a recommended value range for a quote variable based on customer attributes.

2. Description of the Background Art

Configure, price, and quote applications are used in business-to-business (B2B) transactions. Such applications generate quotes for salespeople to present to customers or potential customers. Businesses often operate in competitive environments, thus it is imperative that the salesperson provide a quote with a price that a customer is likely to accept, but also without over-discounting the product, thereby making the sale unprofitable to the business.

Machine learning may be used in such applications to predict a winning price and discount combination for a quote. Typical machine learning applications provide either a single price recommendation or they predict the likelihood of a quote being accepted. For example, the system may predict that the customer will purchase the product at $100,000, or the system may predict an 80% chance that a customer will accept a quote.

The problem with a single price recommendation or prediction score is that it does not convey how confident the prediction system is in its prediction. The standard deviation associated with the prediction may be large. For example, a prediction that there is an 80% likelihood +/−50% that a customer will accept a quote is not as helpful as a prediction that there is an 80% chance that a customer will accept a price between $99,000-$100,000.

Providing a user with a recommended price range inherently lets the user know the extent to which the system is confident, as a smaller range indicates more confidence. For example, if the system predicts that there is an 80% chance that a customer will accept a quote if the price is between $99,000-101,000, the salesperson should be confident in quoting $100 k. However, if the system predicts that there is an 80% chance that the customer will accept a price between $50,000-$120,000, the salesperson will understand that there is significant variation in the data, and a quote of $100,000 may be riskier given the latter prediction than the former prediction.

The best way to provide a recommended price range is to identify the highest-density interval (HDI) in a probability density function (PDF). However, generating a PDF graph is computationally expensive. Moreover, each possible combination of input variables and values has its own PDF, as illustrated below:

a. PDF1=function (a1, b1, c1, d1 ... )
b. PDF2=function (a2, b2, c2, d2 ... )
c. PDF3=function (a3, b3, c3, d3 ... )

There could be billions of combinations, which would require billions of PDFs. For example, if one-hot encoding is used to represent categorical inputs (i.e., each category is represented by a bit having a value of 1 or 0), this drastically increases the possible inputs to a function. This problem is called combinatorial explosion.

Given this, producing a real-time calculation of the HDI for a given set of inputs either requires very large computation and storage resources or a significant limitation on the number of inputs to the PDF prediction function. Therefore, as it would be more cost effective and produce more useful outputs, there is market demand for a configure, price, and quote application that can provide a real-time, recommended range of values for price and other quote variables based on HDI that is computationally efficient without significantly limiting the possible inputs to the PDF prediction function.

SUMMARY OF THE DISCLOSURE

The present disclosure describes a system, method, and computer program for real-time and computationally efficient recommendation of value range for a quote variable, such as price, discount, volume, or closing time. In response to a user engaging in a quote-creation process for a quote with a specific variable, the system calculates the HDI for a PDF prediction function for the variable and provides the HDI as a suggested or recommend range of values for the variable. The HDI is calculated for a given amount of coverage under the PDF graph (e.g., 80%). By calculating the HDI, the system is able to provide a range of values for the quote variable, which will indicate to the user how confident the system is in the recommendation. The inputs to the PDF prediction function are customer attributes and, in some cases, fixed attributes of the quote (e.g., base price of product).

The methods described herein enable the system to perform the HDI calculation in a computationally efficient manner for at least the following reasons:

- A dimension reduction technique (e.g., Principal Component Analysis) is applied to the PDF inputs in both the training and real-time (non-training) phases to reduce the number of possible combinations of PDFs. This significantly reduces the number of PDFs stored by the system without significantly reducing the number of starting inputs to the PDF function.
- Related inputs to a PDF function are grouped together and a PDF is created for each group. This further reduces the number of PDFs that need to be stored by the system.
- A PDF for the quote variable is precomputed for each group. This provides fast access to a PDF during real-time HDI calculations.
- Each precomputed PDF is summarized as an array of discrete points. This provides efficient storage of the PDFs and efficient computation of HDI.
- During a quote-creation process, a PDF look-up table enables the system to efficiently identify an applicable PDF from the group of precomputed PDFs based on reduced input values.

Training data is used to precompute PDFs for the quote variable and to create the PDF look-up table. In one embodiment, training input values are segmented into a grid, and a PDF is created for each cell in the grid. As indicated above, applying a dimension reduction technique to the training inputs reduces the number of PDFs that need to be computed.

During real-time (non-training) calculations of HDI, the system creates inputs for a PDF from customer attributes and reduces them using a dimension reduction technique (e.g., Principle Component Analysis). The system uses the PDF look-up table to identify a PDF that corresponds to the reduced inputs.

The system retrieves the stored array that summarizes the identified PDF, and uses the data in the array to calculate the HDI for the PDF for a given amount of coverage. The system displays the calculated HDI in the user interface. The HDI may be displayed as a recommended or suggested range of values for the quote variable.

DETAILED DESCRIPTION OF THE PREFERRED EMBODIMENTS

The present disclosure describes a system, method, and computer program for a real-time and computationally efficient recommendation of value range for a quote variable, such as price, discount, volume, or closing time. In one embodiment, the method is performed by a computer system that generates quotes for products or services. An example of such a system is a server executing the APTTUS Configure-Price-Quote (CPQ) application on the APTTUS INTELLIGENT CLOUD. Such system is typically used by a salesperson to provide product/service quotes to customers or potential customers.

As used herein, the term "product" refers to a product or a service, and the term "customer" refers to a customer or potential customer. The term "system" or "pricing system" refers to a computer system that assists users in the quote-creation process and performs the methods described herein. A "quote variable" is a variable in a product quote.

A product quote typically has multiple variables, such as price, volume/quantity, closing time, and discount. As part of a quote-creation process, a user (e.g., salesperson) selects values for variables in the quote. The methods described herein enable the system to assist a salesperson in selecting values for one or more variables. The system uses machine learning to provide or suggest a value range for a quote variable. Specifically, the system calculates the HDI for a probability density function for the quote variable, where the HDI represents the system's prediction of a value range for the variable that the customer will accept with a given probability.

Figure 1A:
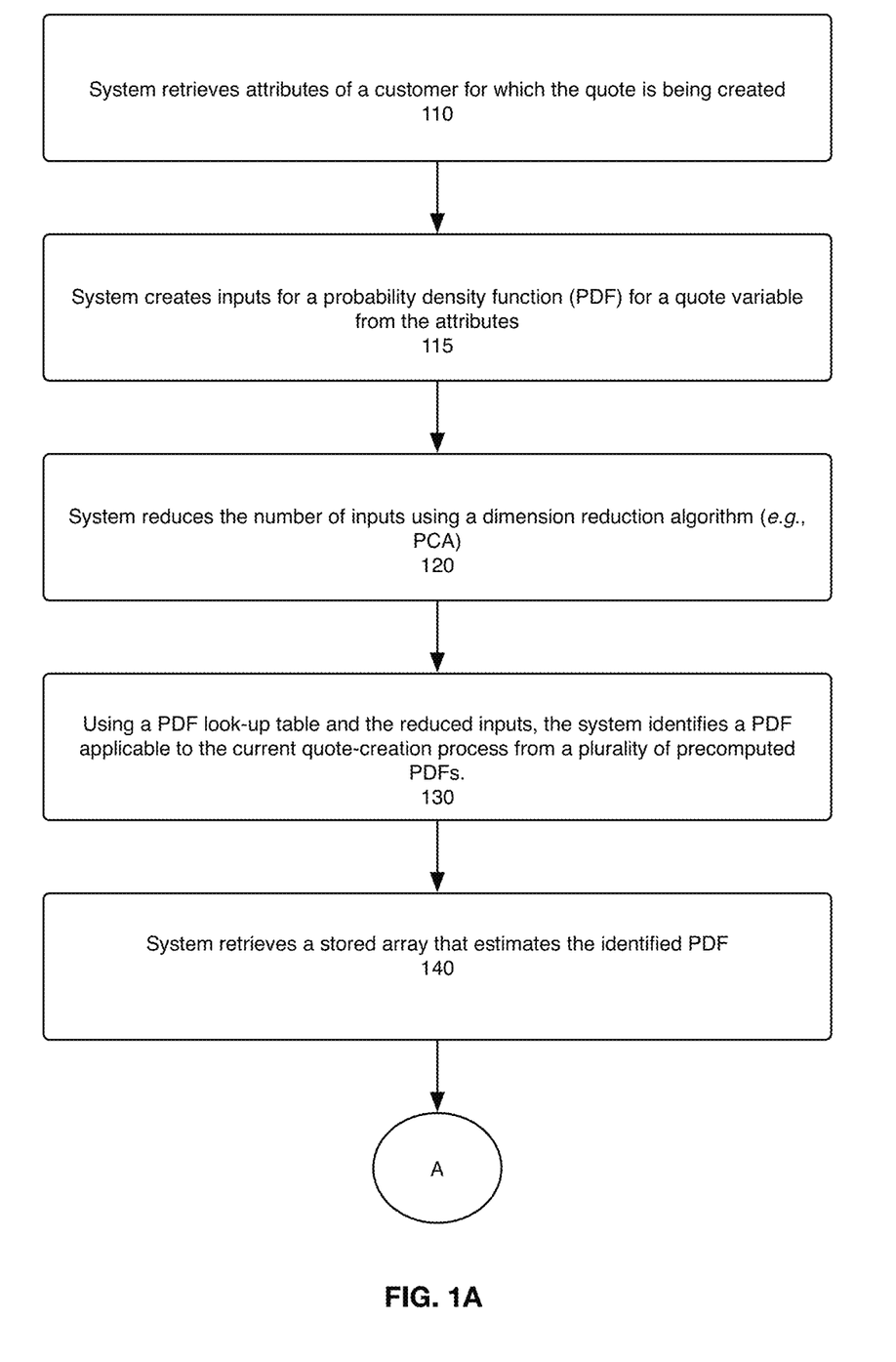
FIGS. 1A-1B are flowcharts that illustrate a method, according to one embodiment, for calculating of a recommended value range for a quote variable using HDI.
Figure 1B:
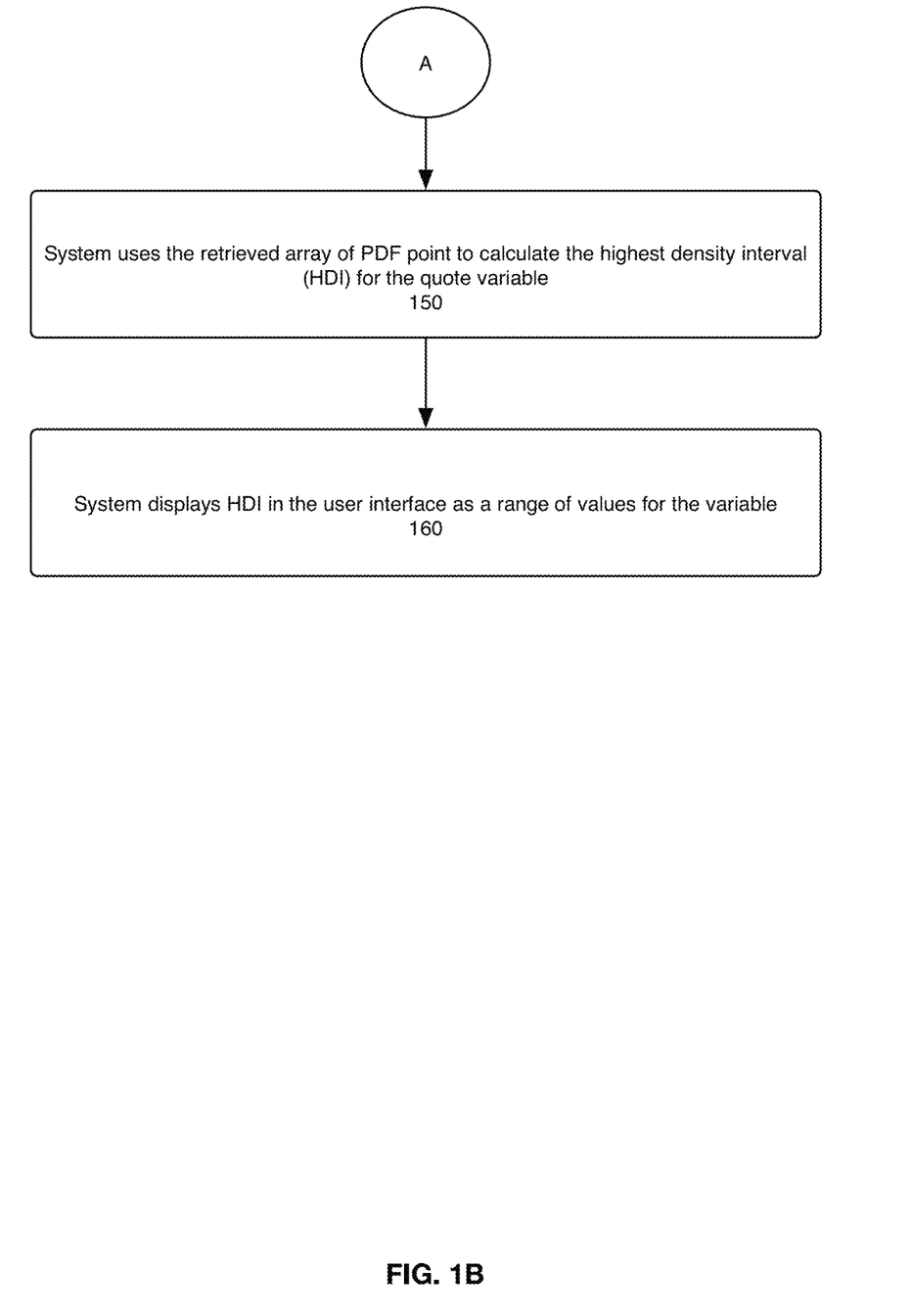

FIG. 1 illustrates a computationally-efficient method for using HDI to recommend a value range for a quote variable. Because the method is computationally-efficient, it may be performed in substantially real-time as the user engages in the quote-generation process. The steps of FIG. 1 are described in more detail below.

In response to a user (e.g., a salesperson) of a pricing system engaging in a quote-create process, the system retrieves attributes of a customer for which the quote is being created (step 110). Examples of customer attributes include size, location, and industry. In one embodiment, the system runs on or works in conjunction with a customer relationship management (CRM) system to obtain the customer attributes. The system may also select certain fixed quote attributes, such as the base price of a product, type of product, etc. In one embodiment, a data scientist predetermines about a dozen customer and/or quote attributes that are selected.

After obtaining the attributes, the system creates inputs (e.g., an input array) for a PDF for a quote variable from the attributes (step 115). The system then reduces the number of inputs to the PDF using a dimension reduction technique (step 120). An example of a dimension reduction technique is Principle Component Analysis (PCA). In one embodiment, PCA is used to transform an input array into a lower dimensional array. The number of inputs after the reduction corresponds to the number of inputs in the PDF-look up table discussed below.

Using a PDF look-up table, the system identifies a PDF applicable to the current quote-creation process from a plurality of precomputed PDFs (step 130). In the PDF look-up table, similar inputs are grouped together and associated with a precomputed PDF, and, therefore, the system identifies the applicable precomputed PDF from the values of the inputs remaining after step 120 ("the reduced inputs"). The PDF look-up table is discussed in more detail with respect to FIGS. 2 and 4.

Figure 2A:
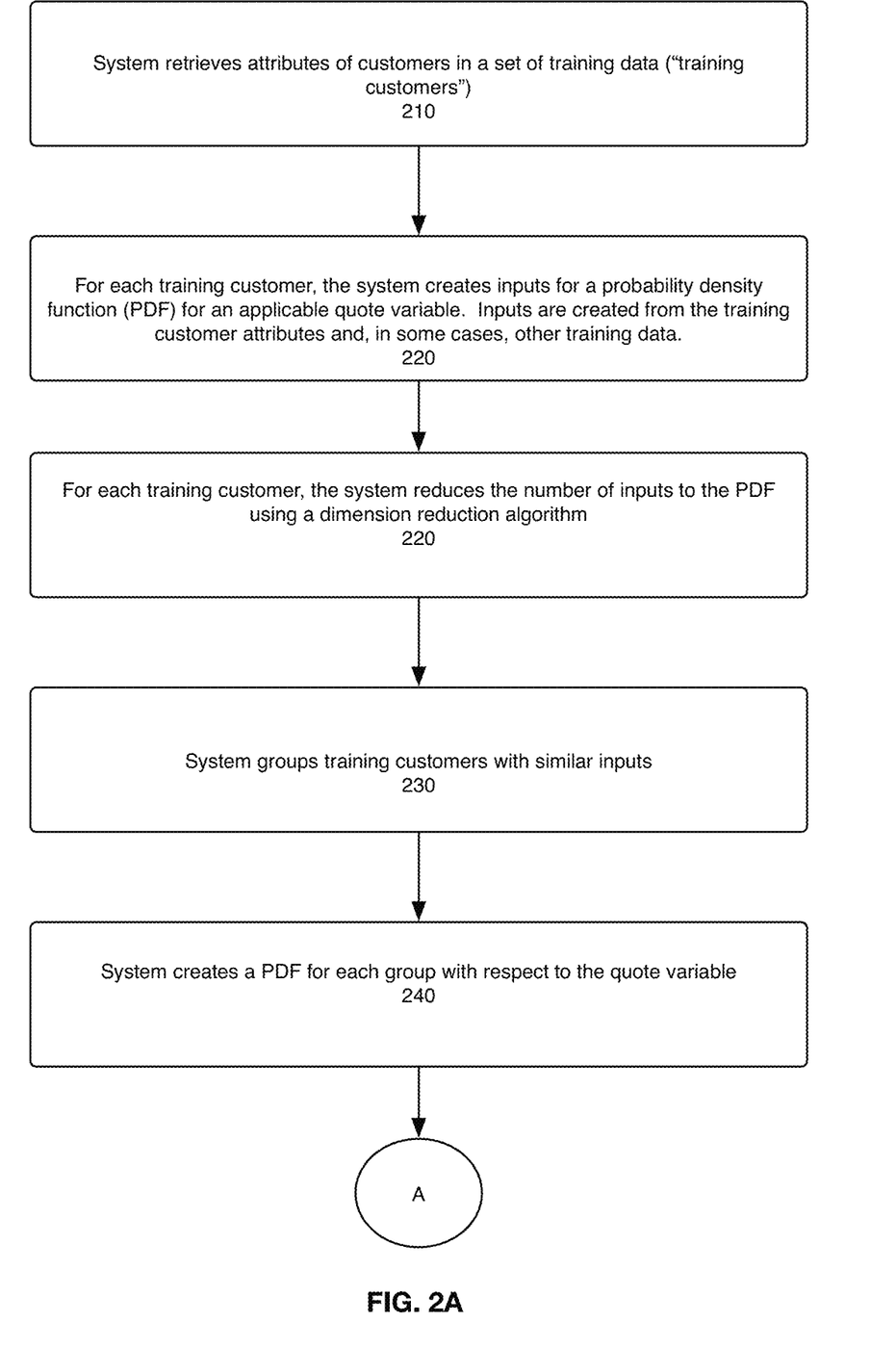
FIGS. 2A-B are flowcharts that illustrate a method, according to one embodiment, for creating a PDF look-up table and stored PDF arrays.
Figure 2B:
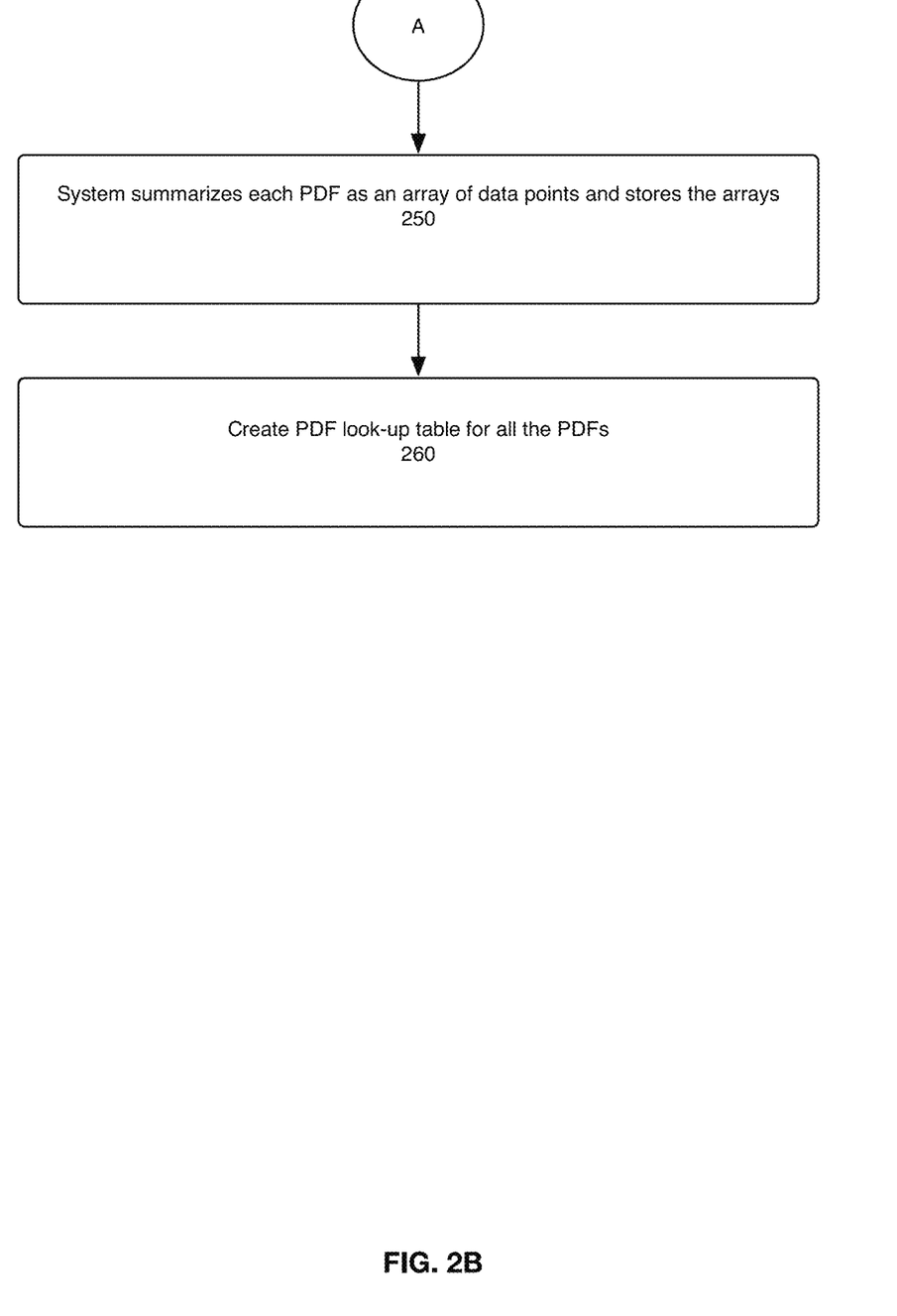

The system then retrieves a stored array that estimates the identified precomputed PDF (step 140). As described with respect to FIG. 2 below, the system represents each precomputed PDF as a graph with discrete points and stores an array with the discrete points.

The system uses the retrieved array of PDF points to calculate the HDI for the quote variable for a given percent of coverage in the PDF graph (i.e., for a given probability of success) (step 150). The HDI is a range of values for the variable that represents a certain percentage under the PDF graph. In one embodiment, a default percentage, such as 80% is used. In other embodiments, the percentage is configurable by an administrator, where the administrator may set different percentages for different users. For example, the administrator may set the percentage for 50% for an experienced salesperson that is skilled in closing a deal and 80% for a junior salesperson that may need a safer range of values.

Figure 5:
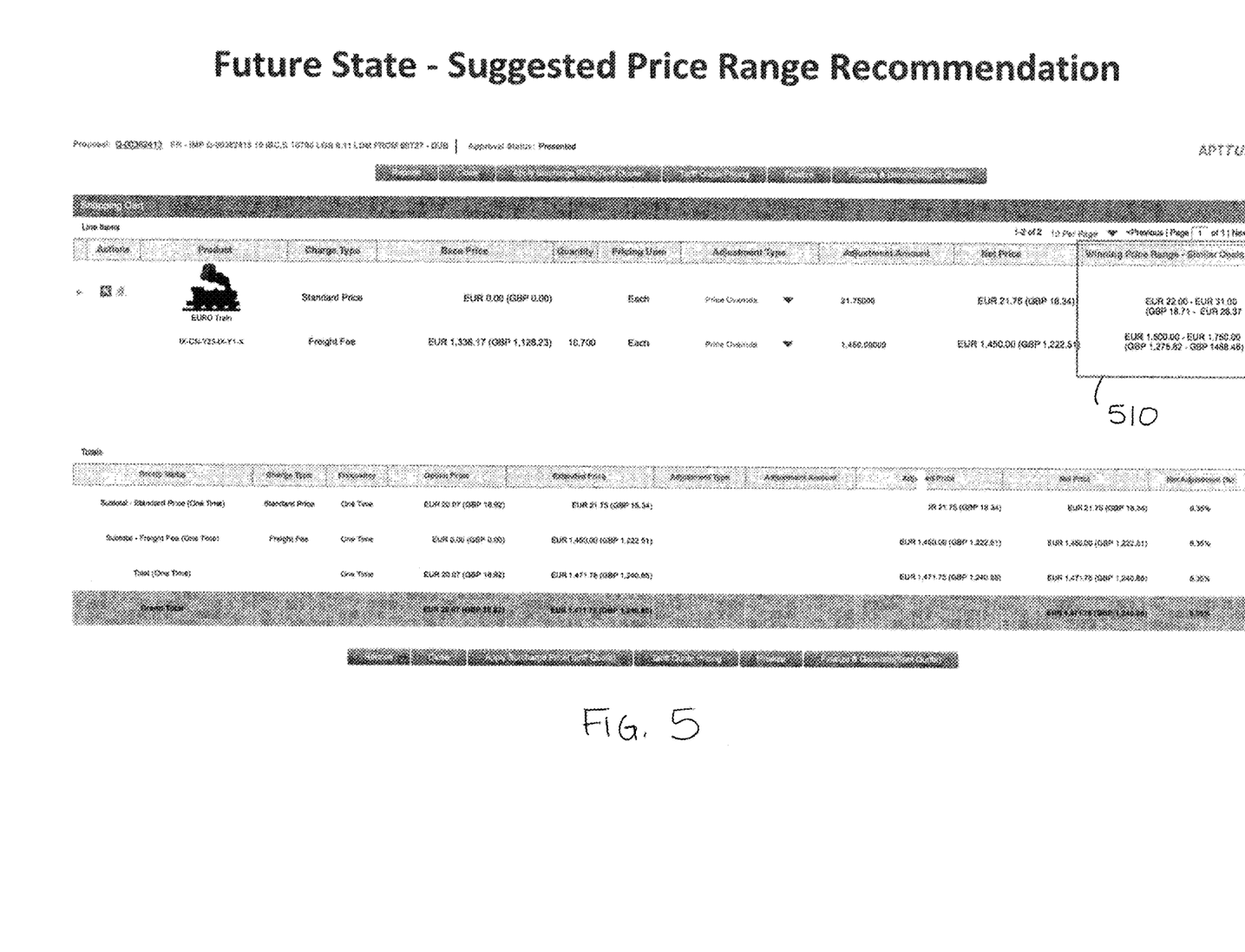
FIG. 5 is a screen shot that illustrates an example user interface of a quote-creation application in which an HDI for a quote variable is displayed.

The pricing system displays the HDI in a user interface (step 160). The interval is displayed as a range of values for the quote variable. The system may characterize the range as a recommended values or likely wining values for the variable. For example, in FIG. 5, the HDI for price is displayed in box 510 as a "winning price range" for similar deals.

The above method enables real-time and computationally efficient calculation of the HDI for a quote variable in that reducing the number of inputs and grouping similar inputs together greatly reduce the number of PDFs required to calculate the HDI. Storing an estimate of the PDF (in the form of an array of discrete points) is more computationally efficient than generating the actual PDF and the stored estimate is much faster to retrieve than generating a PDF.

FIG. 2 illustrates a method for creating the PDF look-up table and stored PDF arrays referenced in FIG. 1. FIG. 2 represents the training phase in which the PDFs are created and summarized as arrays, whereas FIG. 1 is the real-time (non-training) phase in which the PDF arrays are used to calculate the HDI for a variable. The steps of FIG. 2 are described in more detail below.

The system retrieves attributes of customers (e.g., number of employees, location, etc.) and actual quotes (e.g., product, base price, etc.) in a set of training data ("training customers") (step 210). The attributes used may depend on the use case, and a data scientist may determine the attributes used.

For each training customer, the system creates inputs for a PDF for an applicable quote variable from the customer attributes (step 215). The inputs may also include transaction attributes related to the training customer's transactions (e.g., purchase history, frequency of purchases, etc.).

For each training customer, the system reduces the number of inputs to the PDF using a dimension reduction technique (e.g., PCA) (step 220). In one embodiment, the inputs are encoded as an array, and PCA is used to transform the input array in to a lower dimensional array.

The system then groups training customers with similar inputs (e.g., having values within 10% of each other) (step 230). In one embodiment, the groups are created by segmenting input values into a grid (e.g., see FIG. 3).

The system creates a PDF for each group with respect to a quote variable, using the input values of the group and the applicable output from the group's training data (step 240). For example, if net price is the quote variable, then the output used to create the PDF would be net prices of the quotes corresponding to the group.

The system then summarizes each PDF as a graph with discrete points, and stores the discrete points as an array (step 250). In one embodiment, each one percent area under a PDF graph is represented by the two x-axis points that define the x-axis endpoints of the area, as well as the corresponding y-axis density values.

The system creates a PDF look-up table for all the PDFs (step 260). To create the table, the system associates the range of reduced input values for each group with the PDF created for the group. In step 130 in FIG. 1, the system identifies the applicable PDF by identifying the group to which the customer belongs in the PDF table.

Figure 3:
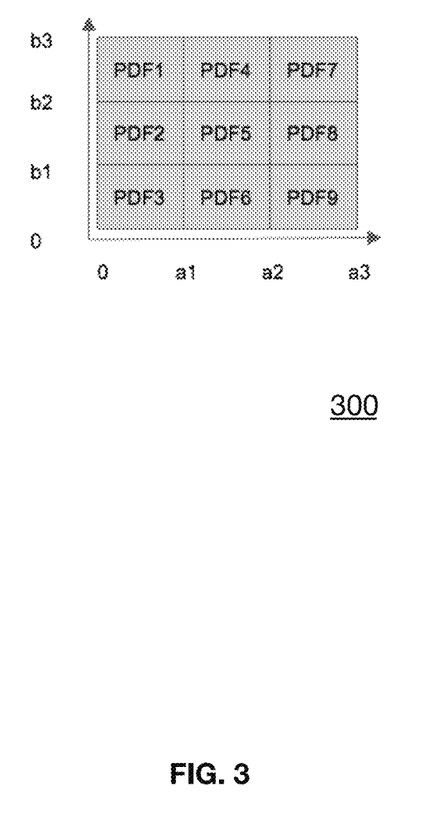
FIG. 3 illustrates an example of a PDF look-up table.

FIG. 3 illustrates an example of a PDF look-up table 300. For simplicity, this example has two input variables, a and b, where the values for a range from 0 to a3, and the values for b range from 0 to b3. In the illustrated example if $a1<a<a2$ and $b2<b<b3$, then function (a,b)=PDF4. The precomputed PDFs correspond to the cells in the grid (i.e., a PDF is computed and stored as an array for each cell in the grid). In this example, the input values were grouped by segmenting the x-y graph into a grid.

Figure 4:
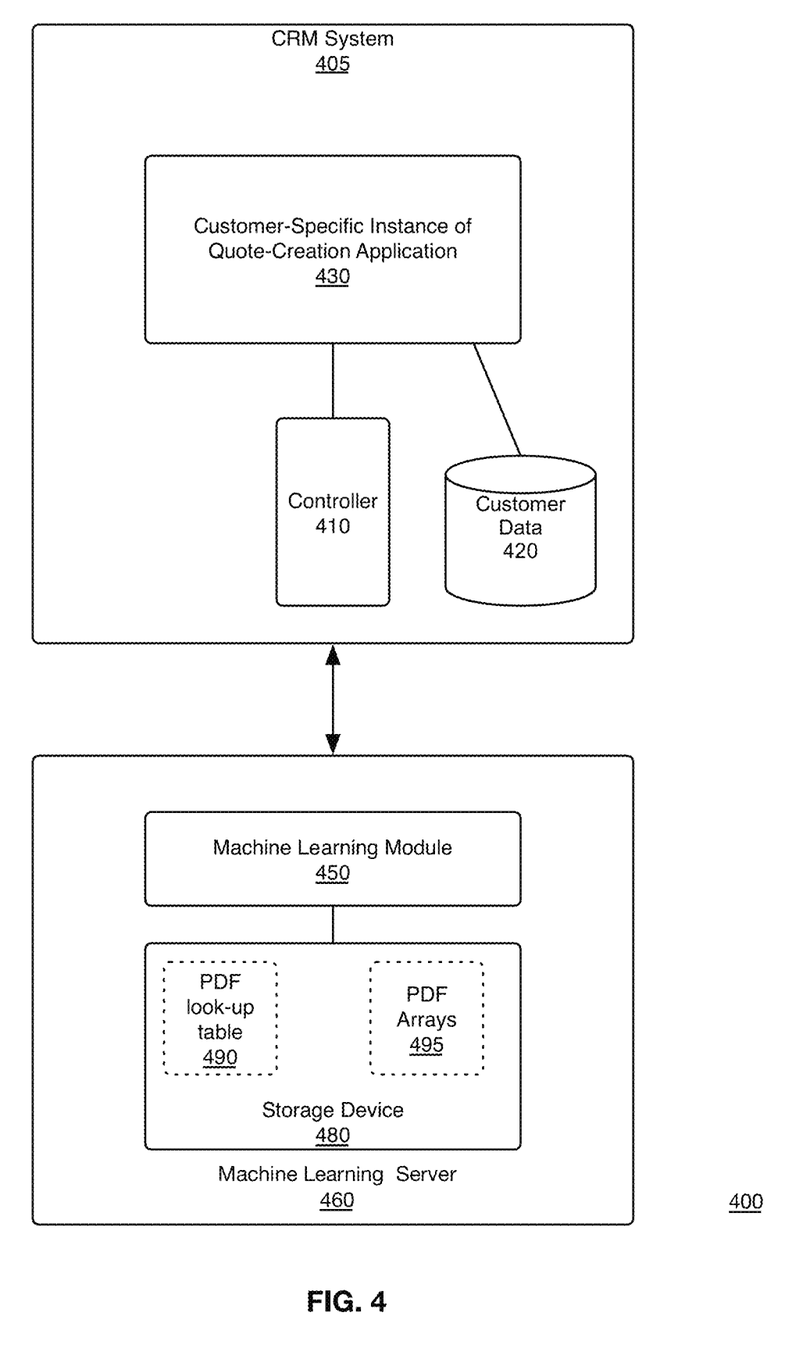
FIG. 4 is a block diagram that illustrates an example software architecture according to one embodiment.

FIG. 4 illustrates an example system architecture for performing the methods described herein. The methods described herein may be implemented in a system configured differently and are not limited to the system architecture illustrated in FIG. 4.

System 400 in FIG. 4 includes a customer relationship management (CRM) system 405, and a machine-learning server 460 that executes machine learning module 450. A CRM system 405 runs customer-specific instances of quote-creation applications 430. An example of a CRM system is the SALESFORCE system, and example of a quote-creation application running on a CRM system is the APTTUS CPQ application. The customer's CRM and quote/product/pricing data is stored in database 420.

Machine learning module 450 performs the methods of FIGS. 1 and 2. Machine learning module 450 access current and training customer and transaction attributes from databases associated with CRM system 405 (e.g., database 420). One or more memory or storage devices 480 stores the PDF look-up table 490 and arrays 495 that estimate the precomputed PDFs.

Controller 410 coordinates between the quote-generation application and the machine learning module 450 to integrate the output of machine learning module 450 in user interfaces of the quote-generation application 430. The controller 410 obtains a value range for a quote variable from the machine learning module 450 and provides them to the customer-specific instance of the quote-generation module 430, as needed, at the applicable points in the quote-generation process. This ensures that the recommended value range for a quote variable are integrated and delivered to a user at the right point in the quote-generation process. The recommended value range is obtained in substantially real time as needed. The recommended value range is displayed in the user interface of the customer-specific instance of the quote-generation application 430 at the applicable point in the quote-to-cash process.

The methods described herein are embodied in software and performed by one or more computer systems (each comprising one or more computing devices) executing the software. A person skilled in the art would understand that a computer system has one or more memory units, disks, or other physical, computer-readable storage media for storing software instructions, as well as one or more processors for executing the software instructions.

As will be understood by those familiar with the art, the invention may be embodied in other specific forms without departing from the spirit or essential characteristics thereof. Accordingly, the above disclosure is intended to be illustrative, but not limiting, of the scope of the invention, which is set forth in the following claims.

The invention claimed is:

1. A method, performed by a pricing system having a customer relationship management (CRM) system running a customer-specific instance of a quote-creation application and a machine-learning server that executes a machine-learning module, for real-time and computationally-efficient calculation of a recommended value range for a quote variable, the method comprising:
   in response to a user of the CRM pricing system engaging in a quote-creation process with the quote variable, the machine-learning module performing the following steps:
      retrieving attributes of a customer from a customer database associated with the CRM system for which the quote is being created;
      creating inputs in an input array for a probability density function (PDF) for the quote variable from the attributes;
      reducing the inputs using a dimension reduction algorithm, wherein reducing the inputs using a dimension reduction algorithm comprises transforming the input array into a lower dimensional array and wherein transforming the input array into a lower dimensional array reduces the number of PDFs stored in a storage device of the machine-learning server;
      identifying an applicable PDF for the quote variable from a plurality of precomputed PDFs, wherein the applicable PDF is identified using the reduced inputs and a PDF look-up table stored on the storage device of the machine-learning server that associates input values with a PDF and wherein, in the PDF look-up table, similar inputs are grouped together and associated with a precomputed PDF and wherein grouping similar inputs together and associating them with a precomputed PDF further reduces the number of PDFs stored in the storage device of the machine-learning server;

retrieving a stored array from the storage device of the machine-learning server that estimates the identified PDF;

calculating a highest-density interval for values for the quote variable using the stored array, wherein the highest-density interval is calculated for a given probability; and displaying the calculated highest-density interval in a user interface of the customer-specific instance of the quote-creation application, wherein the highest-density interval is a prediction of values for the quote variable that the customer will accept with a given probability.

2. The method of claim 1, wherein the quote variable is one of the following: price, closing time, product volume, or discount.

3. The method of claim 1, wherein the highest-density interval is calculated and displayed in substantially real time as the user navigates to a user interface page related to the quote variable.

4. The method of claim 1, wherein the dimension reduction algorithm is principal component analysis (PCA).

5. The method of claim 1, wherein creating the PDF arrays comprises the following steps:
retrieving attributes of customers in a set of training data ("training customers");
for each training customer, creating inputs for a PDF for the quote variable from the attributes and reducing the inputs using a dimension reduction algorithm;
grouping training customers with similar reduced input values;
creating a PDF for each group;
summarizing each PDF as an array of data points; and
storing the arrays.

6. The method of claim 5, wherein the grouping training customers and creating PDFs steps comprise:
segmenting training input values into a grid; and
creating a PDF for each cell in the grid.

7. The method of claim 6, wherein the PDF look-up table is based on the grid.

8. The method of claim 1, wherein the probability is configurable by an administrator of the pricing system.

9. A non-transitory computer-readable medium comprising a computer program, that, when executed by a computer system having a customer relationship management (CRM) system running a customer-specific instance of a quote-creation application and a machine-learning server that executes a machine-learning module, enables the computer system to perform the following method for real-time and computationally-efficient calculation of a recommended value range for a quote variable, the method comprising:
in response to a user of the CRM system engaging in a quote-creation process with the quote variable, the machine-learning module performing the following steps:
retrieving attributes of a customer from a customer database associated with the CRM system for which the quote is being created;
creating inputs in an input array for a probability density function (PDF) for the quote variable from the attributes;
reducing the inputs using a dimension reduction algorithm, wherein reducing the inputs using a dimension reduction algorithm comprises transforming the input array into a lower dimensional array and wherein transforming the input array into a lower dimensional array reduces the number of PDFs stored in a storage device of the machine-learning server;
identifying an applicable PDF for the quote variable from a plurality of precomputed PDFs, wherein the applicable PDF is identified using the reduced inputs and a PDF look-up table stored on the storage device of the machine-learning server that associates input values with a PDF and wherein, in the PDF look-up table, similar inputs are grouped together and associated with a precomputed PDF and wherein grouping similar inputs together and associating them with a precomputed PDF further reduces the number of PDFs stored in the storage device of the machine-learning server;
retrieving a stored array from the storage device of the machine-learning server that estimates the identified PDF;
calculating a highest-density interval for values for the quote variable using the stored array, wherein the highest-density interval is calculated for a given probability; and
displaying the calculated highest-density interval in a user interface of the customer-specific instance of the quote-creation application, wherein the highest-density interval is a prediction of values for the quote variable that the customer will accept with a given probability.

10. The non-transitory computer-readable medium of claim 9, wherein the quote variable is one of the following: price, closing time, product volume, or discount.

11. The non-transitory computer-readable medium of claim 9, wherein the highest-density interval is calculated and displayed in substantially real time as the user navigates to a user interface page related to the quote variable.

12. The non-transitory computer-readable medium of claim 9, wherein the dimension reduction algorithm is principal component analysis (PCA).

13. The non-transitory computer-readable medium of claim 9, wherein creating the PDF arrays comprises the following steps:
retrieving attributes of customers in a set of training data ("training customers");
for each training customer, creating inputs for a PDF for the quote variable from the attributes and reducing the inputs using a dimension reduction algorithm;
grouping training customers with similar reduced input values;
creating a PDF for each group;
summarizing each PDF as an array of data points; and
storing the arrays.

14. The non-transitory computer-readable medium of claim 13, wherein the grouping training customers and creating PDFs steps comprise:
segmenting training input values into a grid; and
creating a PDF for each cell in the grid.

15. The non-transitory computer-readable medium of claim 14, wherein the PDF look-up table is based on the grid.

16. The non-transitory computer-readable medium of claim 9, wherein the probability is configurable by an administrator of the pricing system.

17. A computer system having a customer relationship management (CRM) system running a customer-specific instance of a quote-creation application and a machine-learning server that executes a machine-learning module for real-time and computationally-efficient calculation of a recommended value range for a quote variable, the computer system comprising:
one or more processors;
one or more memory units coupled to the one or more processors, wherein the one or more memory units store instructions that, when executed by the one or more processors, cause the computer system to perform the operations of:
in response to a user of the CRM system engaging in a quote-creation process with the quote variable, the machine-learning module performing the following steps:
retrieving attributes of a customer from a customer database associated with the CRM system for which the quote is being created;
creating inputs in an input array for a probability density function (PDF) for the quote variable from the attributes;
reducing the inputs using a dimension reduction algorithm, wherein reducing the inputs using a dimension reduction algorithm comprises transforming the input array into a lower dimensional array and wherein transforming the input array into a lower dimensional array reduces the number of PDFs stored in a storage device of the machine-learning server;
identifying an applicable PDF for the quote variable from a plurality of precomputed PDFs, wherein the applicable PDF is identified using the reduced inputs and a PDF look-up table stored on the storage device of the machine-learning server that associates input values with a PDF and wherein, in the PDF look-up table, similar inputs are grouped together and associated with a precomputed PDF and wherein grouping similar inputs together and associating them with a precomputed PDF further reduces the number of PDFs stored in the storage device of the machine-learning server;
retrieving a stored array from the storage device of the machine-learning server that estimates the identified PDF;
calculating a highest-density interval for values for the quote variable using the stored array, wherein the highest-density interval is calculated for a given probability; and
displaying the calculated highest-density interval in a user interface of the customer-specific instance of the quote-creation application, wherein the highest-density interval is a prediction of values for the quote variable that the customer will accept with a given probability.

18. The computer system of claim 17, wherein the quote variable is one of the following: price, closing time, product volume, or discount.

19. The computer system of claim 17, wherein the highest-density interval is calculated and displayed in substantially real time as the user navigates to a user interface page related to the quote variable.

20. The computer system of claim 17, wherein the dimension reduction algorithm is principal component analysis (PCA).

21. The computer system of claim 17, wherein creating the PDF arrays comprises the following steps:
retrieving attributes of customers in a set of training data ("training customers");
for each training customer, creating inputs for a PDF for the quote variable from the attributes and reducing the inputs using a dimension reduction algorithm;
grouping training customers with similar reduced input values;
creating a PDF for each group;
summarizing each PDF as an array of data points; and
storing the arrays.

22. The computer system of claim 21, wherein the grouping training customers and creating PDFs steps comprise:
segmenting training input values into a grid; and
creating a PDF for each cell in the grid.

23. The computer system of claim 22, wherein the PDF look-up table is based on the grid.

24. The computer system of claim 17, wherein the probability is configurable by an administrator of the pricing system.

* * * * *

UNITED STATES PATENT AND TRADEMARK OFFICE
CERTIFICATE OF CORRECTION

PATENT NO. : 10,521,491 B2
APPLICATION NO. : 15/615091
DATED : December 31, 2019
INVENTOR(S) : Kirk G. Krappé et al.

Page 1 of 1

It is certified that error appears in the above-identified patent and that said Letters Patent is hereby corrected as shown below:

In the Claims

• Column 6, Line 41 (Claim 1): please delete "pricing".

Signed and Sealed this
Eighteenth Day of February, 2020

Andrei Iancu
*Director of the United States Patent and Trademark Office*